US011144137B2

(12) United States Patent
Cooper et al.

(10) Patent No.: US 11,144,137 B2
(45) Date of Patent: Oct. 12, 2021

(54) COMPUTER POINTING DEVICE

(71) Applicants: The United States Government as Represented by the Department of Veterans Affairs, Washington, DC (US); University of Pittsburgh—Of the Commonwealth System of Higher Education, Pittsburgh, PA (US)

(72) Inventors: Rory A. Cooper, Gibsonia, PA (US); Garrett Grindle, Pittsburgh, PA (US); Zachary Anzelone, Blairsville, PA (US); Aaron Anderson, Pittsburgh, PA (US)

(73) Assignees: The United States Government as Represented by the Department of Veterans Affairs, Washington, DC (US); The University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 123 days.

(21) Appl. No.: 16/801,263

(22) Filed: Feb. 26, 2020

(65) Prior Publication Data
US 2020/0272254 A1 Aug. 27, 2020

Related U.S. Application Data

(60) Provisional application No. 62/810,521, filed on Feb. 26, 2019.

(51) Int. Cl.
*G06F 3/0354* (2013.01)

(52) U.S. Cl.
CPC ................................ *G06F 3/03543* (2013.01)

(58) Field of Classification Search
CPC ................ G06F 3/1446; G09F 9/3026; G09G 2300/026
USPC .......................................................... 345/21
See application file for complete search history.

(56) References Cited

U.S. PATENT DOCUMENTS

| | | |
|---|---|---|
| 4,159,545 A | 7/1979 | Manning et al. |
| 5,157,381 A | 10/1992 | Cheng |
| 5,355,147 A | 10/1994 | Lear |
| 5,376,946 A | 12/1994 | Mikan |
| 5,381,597 A | 1/1995 | Petrove |
| 5,463,388 A | 10/1995 | Boie et al. |
| 5,489,922 A | 2/1996 | Zloof |
| 5,576,733 A | 11/1996 | Lo |
| 5,726,683 A | 3/1998 | Goldstein et al. |
| 5,880,715 A | 3/1999 | Garrett |
| 5,907,318 A | 5/1999 | Medina |
| 5,949,406 A | 9/1999 | Kress |

(Continued)

*Primary Examiner* — Mark Edwards
(74) *Attorney, Agent, or Firm* — Ballard Spahr LLP

(57) ABSTRACT

A manually operable pointing device for use with a computer, adapted for use with a prosthetic hook, includes a shell, a bearing surface, a receptacle, and first and second actuating levers. The shell has a first end and a second end positioned distal thereto. The bearing surface is positioned at the first end of the shell for supporting a portion of the hook. The receptacle is positioned proximate to the second end of the shell and is adapted to receive a tip of the hook. The first actuating lever extends from the first end to the second end and is movable relative to the shell. The second actuating lever extends from the first end to the second end, is movable relative to the shell, and positioned adjacent to the first actuating lever.

23 Claims, 6 Drawing Sheets

(56) References Cited

U.S. PATENT DOCUMENTS

| | | | |
|---|---|---|---|
| 6,031,522 A | 2/2000 | Strand | |
| 6,188,393 B1 | 2/2001 | Shu | |
| D442,595 S | 5/2001 | Lee | |
| 6,262,715 B1 | 7/2001 | Sawyer | |
| 6,300,941 B1 | 10/2001 | Segalle | |
| 6,362,811 B1 | 3/2002 | Edwards et al. | |
| 6,369,799 B1 | 4/2002 | Miccli et al. | |
| 6,392,634 B1 | 5/2002 | Bowers et al. | |
| 6,396,479 B2 | 5/2002 | Gordon | |
| 6,429,851 B1 | 8/2002 | Vaghefi et al. | |
| 6,441,805 B1 | 8/2002 | Reid et al. | |
| 6,509,891 B1 | 6/2003 | Sheehan et al. | |
| 6,727,889 B2 | 4/2004 | Shaw | |
| 6,794,609 B2 | 9/2004 | Mart | |
| 6,853,365 B2 | 2/2005 | Reid et al. | |
| D509,828 S | 9/2005 | Wang | |
| 7,154,475 B2 | 12/2006 | Crew | |
| 7,212,191 B2 | 5/2007 | Snijders | |
| 7,733,326 B1 | 6/2010 | Adiseshan | |
| D888,465 S * | 6/2020 | Weng | D6/610 |
| 2006/0007152 A1 | 1/2006 | Wang | |
| 2008/0218478 A1* | 9/2008 | Cheng | G06F 3/03543 345/163 |
| 2013/0120259 A1* | 5/2013 | Piot | G06F 3/0416 345/163 |
| 2016/0224138 A1 | 8/2016 | Adkins | |

\* cited by examiner 24, 26

COMPUTER POINTING DEVICE

CROSS REFERENCE TO RELATED APPLICATIONS

This application is based upon and claims the benefit of priority to U.S. Provisional Application No. 62/810,521, filed Feb. 26, 2019, and hereby incorporated by reference in its entirety.

FIELD OF THE INVENTION

This invention relates to a computer pointing device, commonly known as a "mouse", for use with a prosthetic arm.

BACKGROUND

It is difficult to imagine a modern computer without a mouse. The operating systems and applications of today co-evolved with the mouse, and some software literally cannot be used without a mouse. The mouse is used for pointing, clicking, double-clicking, and dragging. The operations that are most troublesome for individuals with physical disabilities are often those that involve button presses or multiple actions (i.e. dragging).

Computer pointing devices which allow use of the graphical user interface on most computers (external mice, mouse pads on laptops or touch screens) are not well adapted for use by those with prosthetic arms having terminal devices such as the Hosmer 5x (hook). Moving the mouse on the table is difficult because it was designed to be controlled with the palm of a hand. Using the buttons is also difficult because they were designed to be pressed with finger tips. Someone with a prosthetic hook has neither a palm nor fingers.

The traditional mouse and the keyboard are the two primary human computer interfaces. Persons with prosthetics arms or dexterity limitations have a wide range of functional variation so that they may have limited or no ability to interact with a computer using either of these devices.

In addition to the traditional mouse and keyboard, other computer interfaces include track balls, on-screen keyboards, mouth-sticks, head controls, switches, speech recognition, and alternative augmentative communications (AAC) devices. These interfaces are either inaccessible to individuals with prosthetic arms or they are very inefficient when compared to a mouse. Persons with a prosthetic arm or dexterity limitations can also use a feature called Sticky Keys. This feature is commonly present in Microsoft and MAC operating systems and allows the user to press keys sequentially instead of simultaneously to perform an action.

For many people with upper extremity amputations, a mouth-stick interface is not accurate nor comfortable to use. Eye movement and electroencephalography (EEG) methods are capable of providing only a few controlled movements, have slow response time due to signal processing, and require substantial motor coordination. For infrared or ultrasound-controlled computer mice, there are two main factors that are of concern to users: (1) determining whether the transmitter is within an effective range with respect to the receiver; and (2) the fluidity and response time of the cursor in response to the movement of the person's head. These considerations increase the workload for people with disabilities. Alternative systems that utilize commercially available electronics to simply and easily perform tasks are required.

The ability to operate a computer mouse is important to people with disabilities especially as the advancement of technology allows more and more functions to be controlled by computer. There are many reasons for people with disabilities to operate a computer. For example, they need to acquire new knowledge and communicate with the outside world through the Internet. In addition, they need to work at home, enjoy leisure activities, and manage many other things, such as home shopping and internet banking. There is clearly an opportunity to develop a pointing device ("mouse") specifically adapted for efficient and comfortable engagement with a prosthetic limb.

SUMMARY

This invention concerns a manually operable pointing device for use with a computer. The device is adapted for use with a prosthetic hook. In one example embodiment, the device comprises a shell, a bearing surface, a receptacle, a first actuating lever, and a second actuating lever. The shell has a first end and a second end positioned distal thereto. The bearing surface is positioned at the first end of the shell for supporting a portion of the hook. The receptacle is positioned proximate to the second end of the shell, and has a receptacle surface adapted to receive a tip of the hook. The first actuating lever extends from the first end to the second end and is movable relatively to the shell. The second actuating lever extends from the first end to the second end, is movable relatively to the shell, and is positioned adjacent to the first actuating lever.

In an example, the receptacle surface is concave. As an example, the receptacle further comprises a flange positioned proximate to the second end. The flange projects transverse to the receptacle surface.

As an example, the first and second actuating levers have a concave curvature over a first region positioned proximate to the first end of the shell, and a convex curvature over a second region proximate to the receptacle. In an example, the receptacle is offset from a centerline extending between the first and the second ends of the shell.

In an example, the bearing surface comprises a bar oriented transversely to a centerline extending between the first and the second ends of the shell. In a particular example, the bar comprises a material having a high coefficient of friction.

As an example, the pointing device further comprises a base, the shell being attached thereto overlying the base. In a particular example, the receptacle is mounted on the base. In another particular example, the based comprises a material having a low coefficient of friction. In yet another particular example, the first and second actuating levers are movable toward and away from the base.

In an example, the first and second actuating levers comprise a material having a high coefficient of friction.

In another example embodiment, the device comprises a shell, a bearing surface, a receptacle, a flange, a first actuating lever and a second actuating lever. The shell has a first end and a second end positioned distal thereto. The bearing surface is positioned at the first end of the shell for supporting a portion of the hook. The receptacle is positioned proximate to the second end of the shell, and has a receptacle surface adapted to receive a tip of the hook. The flange is positioned proximate to the second end of the shell and projects transversely to the receptacle surface. The first actuating lever extends from the first end to the second end and is movable relatively to the shell. The second actuating lever extends from the first end to the second end, is movable relatively to the shell, and is positioned adjacent to the first actuating lever.

As an example the receptacle surface is concave. In an example, the first and second actuating levers have a concave curvature over a first region positioned proximate to the first end of the shell, and a convex curvature over a second region proximate to the receptacle. In an example, the receptacle is offset from a centerline extending between the first and the second ends of the shell.

In an example, the bearing surface comprises a bar oriented transversely to a centerline extending between the first and the second ends of the shell. In a particular example, the bar comprises a material having a high coefficient of friction.

As an example, the pointing device further comprises a base, the shell being attached thereto overlying the base. In a particular example, the receptacle is mounted on the base. In another particular example, the based comprises a material having a low coefficient of friction. In yet another particular example, the first and second actuating levers are movable toward and away from the base.

In an example, the first and second actuating levers comprise a material having a high coefficient of friction.

DETAILED DESCRIPTION

Figure 1:
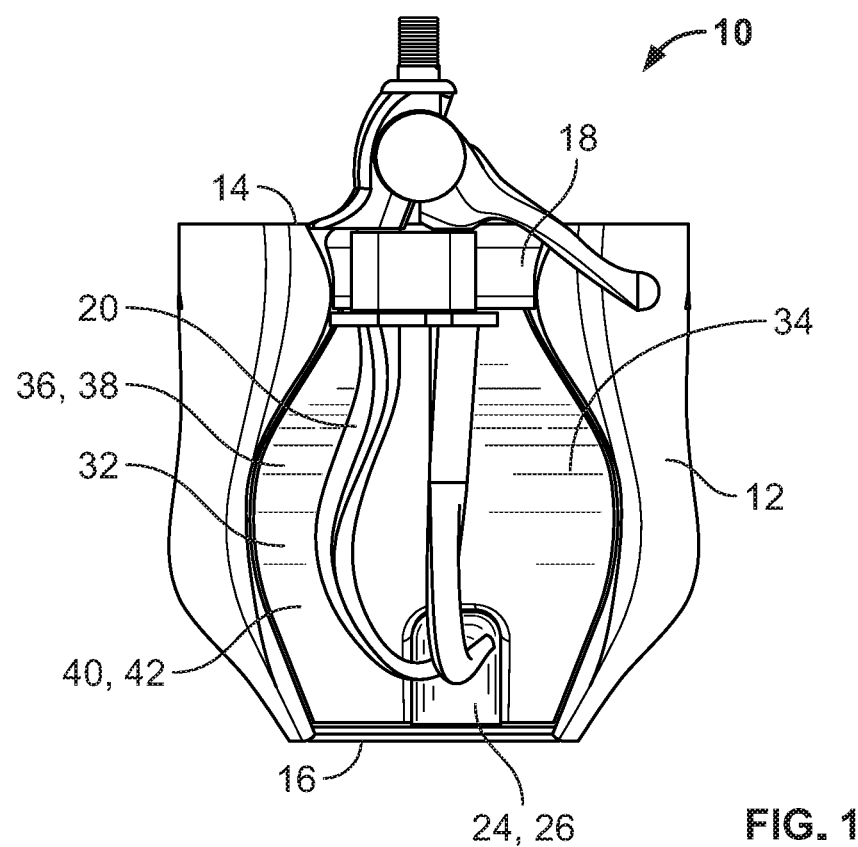
FIG. 1 is a top view of an example computer pointing device being engaged by a terminal device of a prosthetic arm.
Figure 2:
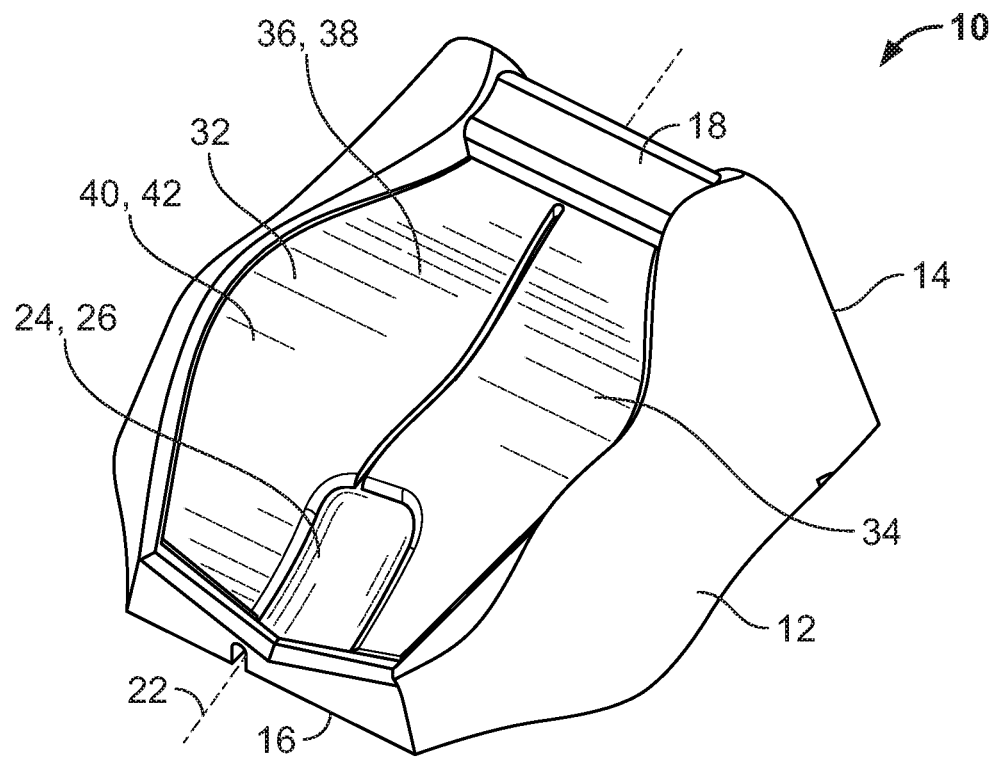
FIG. 2 is an isometric view of the pointing device shown in FIG. 1.
Figure 3:
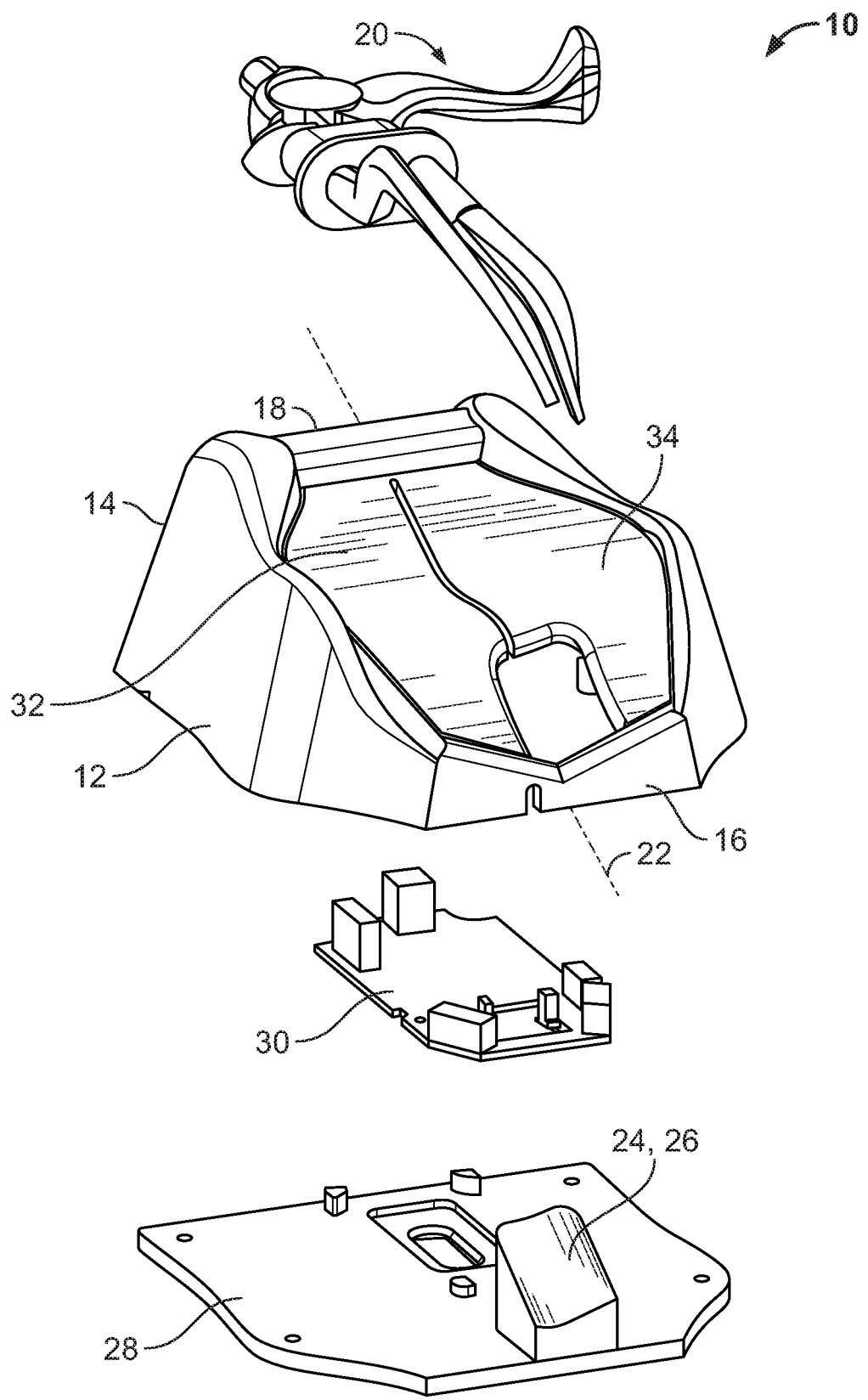
FIG. 3 is an exploded isometric view of the pointing device and terminal device shown in FIG. 1.
Figure 5:
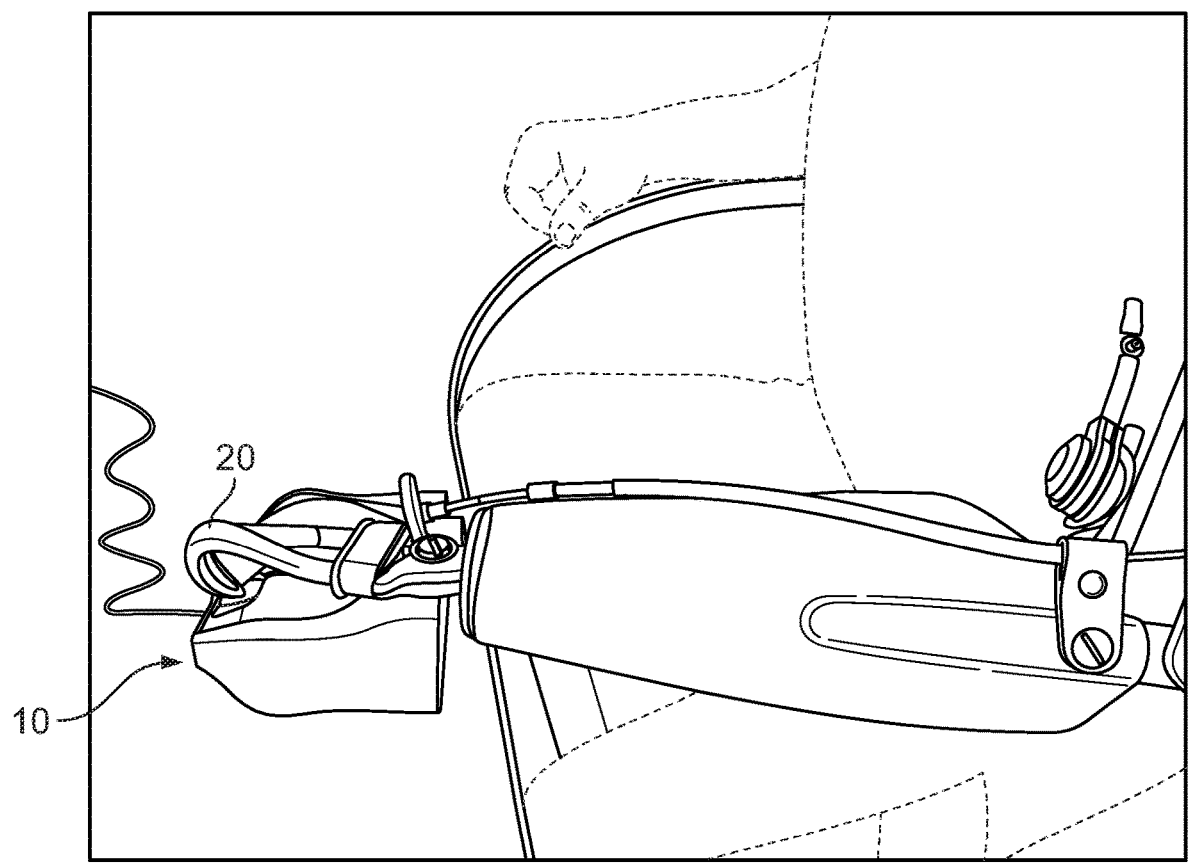
FIG. 5 is an illustration showing the pointing device according to the invention in use.

FIGS. 1, 2 and 3 show an example embodiment of a manually operable pointing device 10 according to the invention. Device 10 is adapted for use with a prosthetic terminal device in the form of a hook 20 (see FIG. 1), and comprises a shell 12 having a first end 14 and a second end 16 positioned distal to the first end. A bearing surface 18 is positioned at the first end 14 of shell 12. The bearing surface 18 supports a portion of the hook 20 (see also FIGS. 1, and 5) when in use. In this example the bearing surface comprises a bar oriented transversely to a centerline 22 of the shell 12 extending between its first and second ends 14 and 16. It is advantageous that the bar comprise material having a high coefficient of friction, for example, a rubber compound, polyurethane and the like. The high coefficient of friction of the bearing surface 18 prevents slippage between the hook 20 and the shell and affords excellent control over movement of the device 10.

Figure 4:
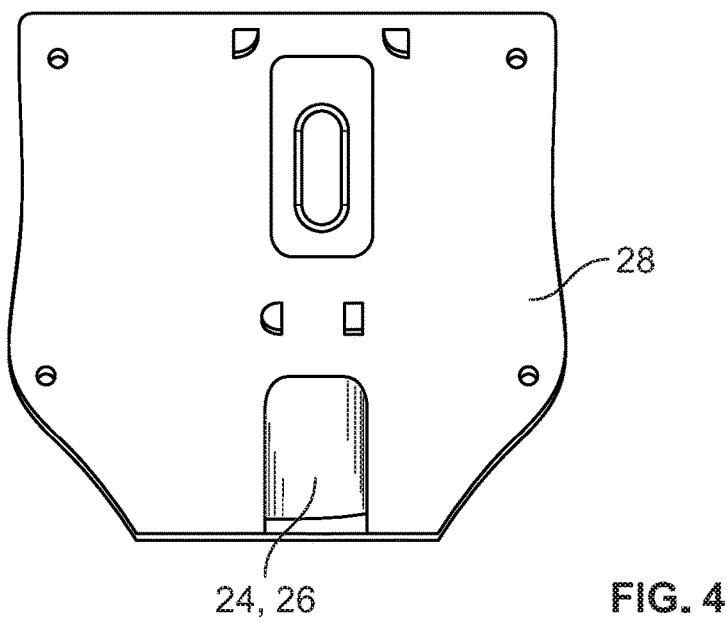
FIG. 4 is a top view of a portion of the pointing device shown in FIG. 1.
Figure 6A:
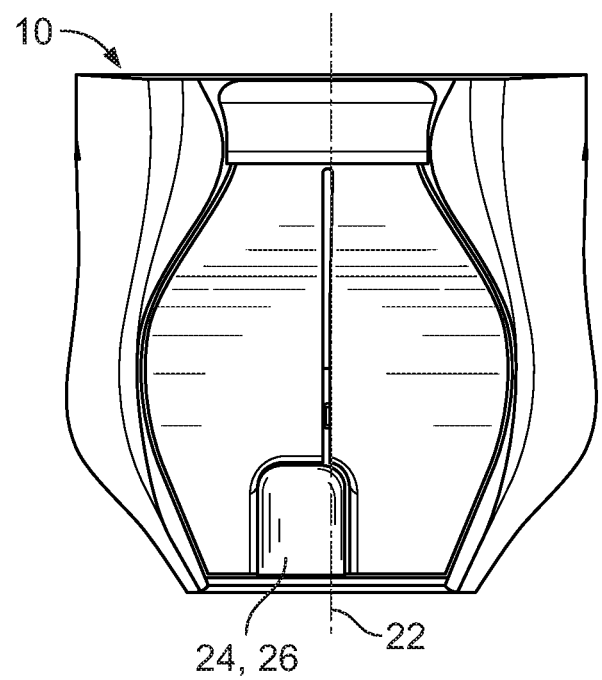
FIGS. 6A and 6B show top views of right and left hand embodiments of the pointing device according to the invention.
Figure 6B:
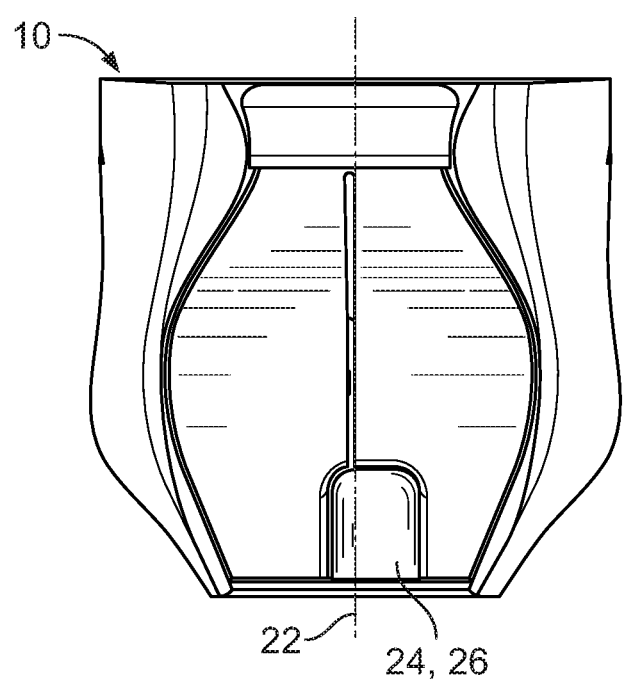

A receptacle 24 is positioned proximate to the second end 16 of shell 12. As shown in FIGS. 1, 2 and 4, receptacle 24 has a receptacle surface 26 that is adapted to receive a tip of the hook 20. The receptacle surface may be concave. As shown in FIGS. 6A and 6B, receptacle 24 may be positioned offset from the centerline 22 to provide left (FIG. 6B) and right handed (FIG. 6A) embodiments of the device 10.

As shown in FIG. 3, the receptacle 24 is mounted on a base 28, and the shell 12 is attached to the base in overlying relation. Receptacle 24 is thus fixed in relation to the shell 12. Together the shell 12 and base 28 contain the internal electromechanical components 30 typically used in pointing devices. Advantageously, base 28 comprises a material having a low coefficient of friction, such as polytetrafluoroethylene. The low friction coefficient of the base permits it to slide easily over a surface during use, thereby affording improved control of the device's movement.

FIG. 2 shows first and second actuating levers 32 and 34 which correlate to the left and right buttons on a standard mouse. The actuating levers extend between the first and second ends 14 and 16 of shell 12 and are movable relatively thereto. In this example the actuating levers 32 and 34 are movable toward and away from the base 28 (see FIG. 3) and serve to actuate switches, which are part of the internal components 30, used to identify, select and drag and drop items in the graphical user interface of a computer with which the device is being used. The actuating levers 32 and 34 are arranged adjacent to one another and advantageously comprise material having a high coefficient of friction (rubber compounds, polyurethane) to prevent slippage between the hook 20 and the levers 32 and 34 when they are being pressed. Further advantage may be secured by contouring the surfaces of the levers. In this example, the actuating levers have a concave curvature 36 over a first region 38 proximate the first end 14 of the shell 12, and a convex curvature 40 over a second region 42 proximate to the receptacle 24. The concave/convex surface shape of the actuating levers 32 and 34 allow the levers to be actuated by rotating the hook 20 to the left or right while still maintaining the hook's tip engaged with the receptacle 24, thereby permitting simultaneous movement of the device 10 while maintaining pressure on one of the actuating levers. The shape further permits the tip of the hook to be used to depress the actuating levers 32 and 24.

Figure 7A:
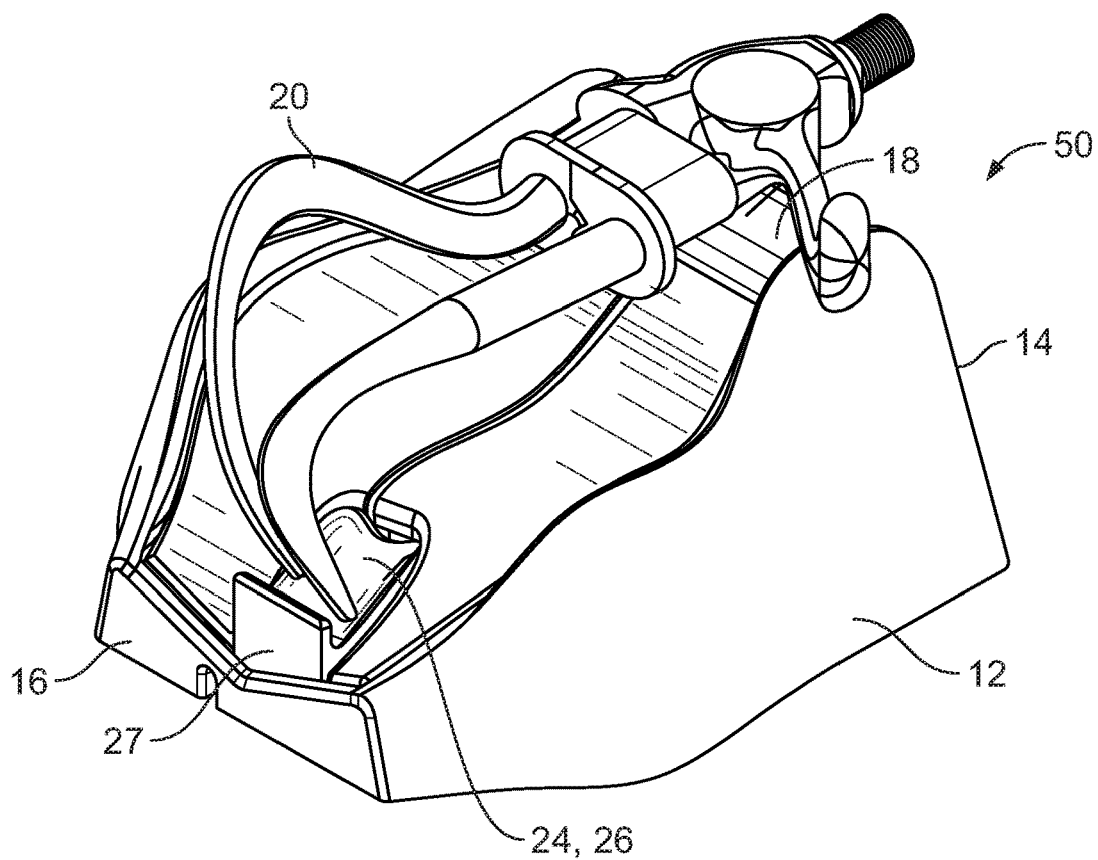
FIG. 7A is an isometric view of another example computer pointing device being engaged by a terminal device of a prosthetic arm.
Figure 7B:
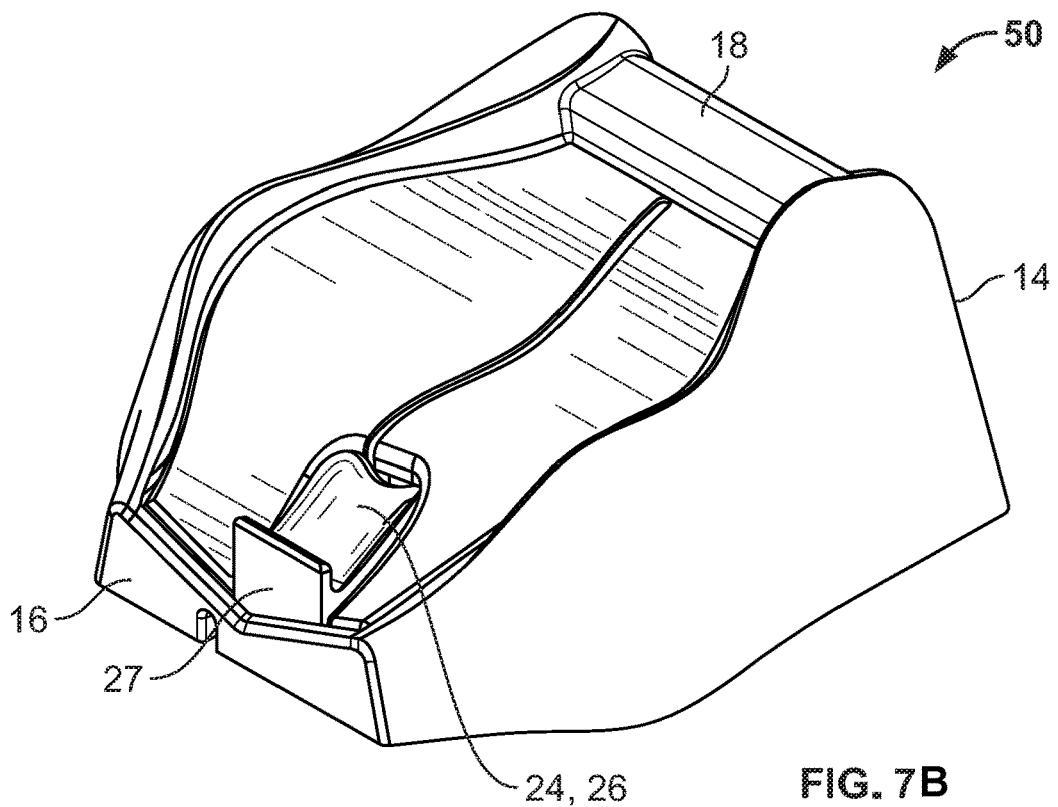
FIG. 7B is an isometric view of the pointing device shown in FIG. 7A.
Figure 8:
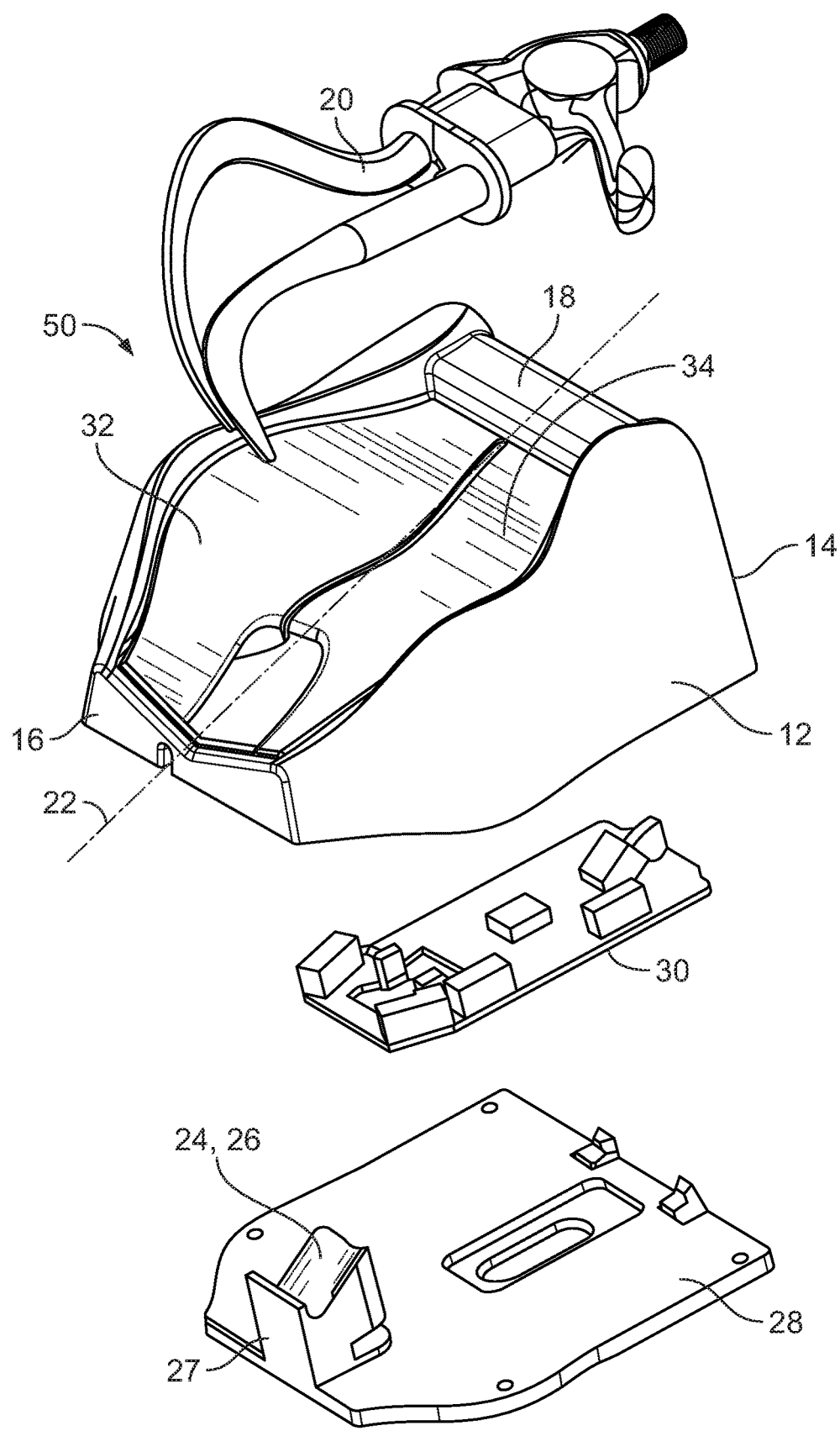
FIG. 8 is an exploded isometric view of the pointing device and terminal device shown in FIG. 7A.

In another embodiment shown in FIGS. 7A, 7B, and 8, device 50 is adapted for use with a prosthetic terminal device in the form of a hook 20 (see FIG. 7A), and comprises a shell 12 having a first end 14 and a second end 16 positioned distal to the first end. A bearing surface 18 is positioned at the first end 14 of shell 12. The bearing surface 18 supports a portion of the hook (see also FIGS. 7A and 8) when in use. As shown in FIG. 7A, a receptacle 24, positioned proximate to the second end 16 of shell 12, has a receptacle surface 26 adapted to receive a tip of the hook 20. A flange 27 is positioned proximate to the second end 16 of the shell 12. As shown in FIGS. 7B and 8, the flange 27 projects transversely to the receptacle surface 26. The inclusion of the flange 27 advantageously prevents the hook 20 from moving toward the second end 16 of the shell 12, thus preventing hook 20 from slipping off the device 50 when moving device 50 along or transverse to centerline 22.

Pointing devices according to the invention are expected to improve the computer-human interface for people having prosthetic limbs.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A manually operable pointing device for use with a computer, said device being adapted for use with a prosthetic hook, said device comprising:
    a shell having a first end and a second end positioned distal thereto;
    a bearing surface positioned at said first end of said shell for supporting a portion of said hook;
    a receptacle positioned proximate to said second end of said shell, said receptacle having a receptacle surface adapted to receive a tip of said hook;
    a first actuating lever extending from said first end to said second end, said actuating lever being movable relatively to said shell;
    a second actuating lever extending from said first end to said second end, said second actuating lever being movable relatively to said shell and being positioned adjacent to said first actuating lever.

2. The pointing device according to claim 1, wherein said receptacle surface is concave.

3. The pointing device according to claim 1, wherein said receptacle further comprises a flange positioned proximate to said second end, said flange projecting transverse to said receptacle surface.

4. The pointing device according to claim 1, wherein said first and second actuating levers have a concave curvature over a first region positioned proximate to said first end of said shell, and a convex curvature over a second region proximate to said receptacle.

5. The pointing device according to claim 1, wherein said receptacle is offset from a centerline extending between said first and said second ends of said shell.

6. The pointing device according to claim 1, wherein said bearing surface comprises a bar oriented transversely to a centerline extending between said first and said second ends of said shell.

7. The pointing device according to claim 6, wherein said bar comprises a material having a high coefficient of friction.

8. The pointing device according to claim 1, further comprising a base, said shell being attached thereto overlying said base.

9. The pointing device according to claim 8, wherein said receptacle is mounted on said base.

10. The pointing device according to claim 8, wherein said base comprises a material having a low coefficient of friction.

11. The pointing device according to claim 8, wherein said first and second actuating levers are movable toward and away from said base.

12. The pointing device according to claim 1, wherein said first and second actuating levers comprise a material having a high coefficient of friction.

13. A manually operable pointing device for use with a computer, said device being adapted for use with a prosthetic hook, said device comprising:
    a shell having a first end and a second end positioned distal thereto;
    a bearing surface positioned at said first end of said shell for supporting a portion of said hook;
    a receptacle comprising a receptacle surface, said receptacle positioned proximate to said second end of said shell, said receptacle surface adapted to receive a tip of said hook;
    a flange positioned proximate to said second end of said shell and projecting transverse to said receptacle surface;
    a first actuating lever extending from said first end to said second end, said actuating lever being movable relatively to said shell;
    a second actuating lever extending from said first end to said second end, said second actuating lever being movable relatively to said shell and being positioned adjacent to said first actuating lever.

14. The pointing device according to claim 13, wherein said receptacle surface is concave.

15. The pointing device according to claim 13, wherein said first and second actuating levers have a concave curvature over a first region positioned proximate to said first end of said shell, and a convex curvature over a second region proximate to said receptacle.

16. The pointing device according to claim 13, wherein said receptacle is offset from a centerline extending between said first and said second ends of said shell.

17. The pointing device according to claim 13, wherein said bearing surface comprises a bar oriented transversely to a centerline extending between said first and said second ends of said shell.

18. The pointing device according to claim 17, wherein said bar comprises a material having a high coefficient of friction.

19. The pointing device according to claim 13, further comprising a base, said shell being attached thereto overlying said base.

20. The pointing device according to claim 19, wherein said receptacle is mounted on said base.

21. The pointing device according to claim 19, wherein said base comprises a material having a low coefficient of friction.

22. The pointing device according to claim 19, wherein said first and second actuating levers are movable toward and away from said base.

23. The pointing device according to claim 13, wherein said first and second actuating levers comprise a material having a high coefficient of friction.

* * * * *